Feb. 23, 1971    R. D. ORR ET AL    3,565,764

SUGAR PRODUCTION FROM AMYLACEOUS MATERIALS

Filed May 31, 1968

INVENTORS
RICHARD D. ORR
FLOYD K. SHOUP

BY  LeFEVER, QUILLINAN
& HUBBARD
ATTORNEYS

United States Patent Office 3,565,764
Patented Feb. 23, 1971

3,565,764
SUGAR PRODUCTION FROM AMYLACEOUS
MATERIALS
Richard D. Orr, Vacaville, Calif., and Floyd K. Shoup,
Manhattan, Kans., assignors to General Foods Corporation, White Plains, N.Y., a corporation of Delaware
Continuation-in-part of application Ser. No. 644,692,
June 8, 1967. This application May 31, 1968, Ser.
No. 733,251
Int. Cl. C12b 1/00
U.S. Cl. 195—31
8 Claims

ABSTRACT OF THE DISCLOSURE

Direct enzyme conversion of raw grain material is effected in a continuous process by initially liquefying starch containing an amylolytic enzyme at a temperature exceeding its gelatinization point and below the enzyme inactivating temperature by continuously injecting steam into the starch slurry and thereafter saccharifying the liquefied starch by saccharifying enzymes such as are high in amyloglucosidase.

Figure 1:
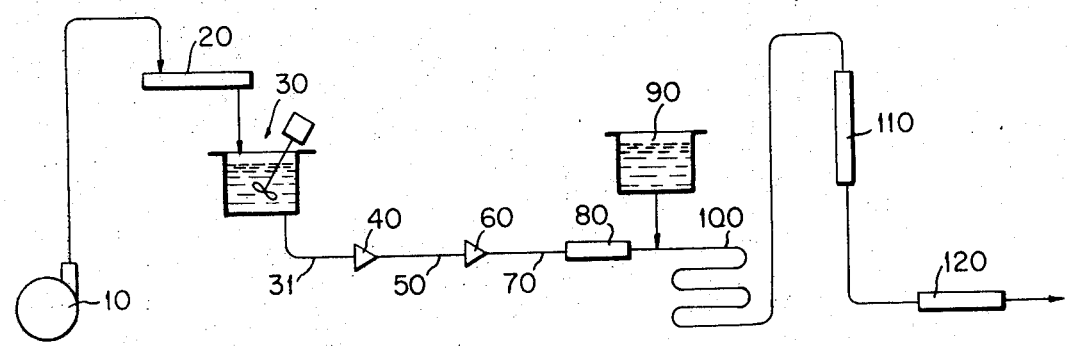

This application is a continuation-in-part of Ser. No. 644,692 filed June 8, 1967 for Food Process and Product now abandoned.

This invention relates to improvements in the manufacture of starch degradation products and specifically the manufacture of sugars such as glucose and like high-sugar syrups. More particularly the invention relates to a process enabling the continuous conversion of raw, semi-refined or "refined" starch materials containing native ash, protein and lipids to starch conversion products in an efficient, in-line manner which is relatively free of troublesome manufacturing problems and calls for comparatively reduced capital expense.

The known art of enzymatic saccharification of starch has emerged to a point where the dual enzyme system of first liquefying and then saccharifying starch to the desired sugar yield is undergoing rapid change. Despite such emergence of a two-enzyme system, there are continuing limitations that remain to be solved and, to some degree limit the fullest exploitation of enzymic conversion of amylaceous materials to sugars and sugar syrups. Most published work of which we are aware proposes the conversion of starch in a manner which experiences accompanying interfering processing limitations such as the inability to separate in liquefied form a good yield of filtrate from the converted liquor, particularly when treating raw or semi-refined amylaceous materials. During this process, whether it be addressed to the production of fermentable sugars such as maltose by enzyme systems (typically barley malt) or to dextrose, by the use of amyloglucosidase, it appears that liquor conditions lengthen the requisite over-all holding or processing time and introduce added costs both in enzyme utilization and equipment for effecting such holding or for refining the liquor either preparatory to, during, or subsequent to saccharification.

The present invention is founded upon the discovery that amylaceous material such as whole ground corn or degerminated corn flour as well as refined starches can be practically treated in a continuous in-line liquefying and continuous or batch saccharifying operation employing enzymic conversion provided the starch or amylaceous component is treated by a presaccharification procedure wherein an aqueous dispersion of such starch and alpha-amylase is raised rapidly from sub-gelatinization and subamylolytic temperatures by direct steam injection with concomitant turbulence to an amylolysis temperature well in excess of the gelatinization temperature and typically over 160° F., duration and temperature of treatment of the liquefying substrate being controlled hydrolyze the starch content to at least 10 D.E. to yield a desired character of filterable solids, and the starch hydrolyzate being thereafter rapidly brought to a temperature well in excess of 212° F. (preferably by steam injection) also under such turbulence as will completely and rapidly gelatinize even the most difficult gelatinizable constituents in the starch and terminate amylolysis.

By virtue of this procedure it has been found that the resulting liquefied material contains insoluble solids in a condition wherein they can be readily separated from the presaccharification liquor as by filtration or centrifugation; this property is manifested by a high ultimate recovery of the starch hydrolyzate fraction in the filtrate. In this connection it has been found that the duration of such liquefaction should be regulated so as to maximize the yield of starch hydrolyzate filtrate.

Processing preparatory to treatment in accordance with the present invention involves subdivision of the preferred starting material, e.g., corn, by grinding and screening, and the mixing therewith of water and material containing liquefying enzyme such as barley malt or refined alpha-amylase, followed by in-line steam injection cooking as by jet cooking the starch slurry to gelatinize the starch and promote amyloylsis, which cooking conditions are maintained for a holding operation of limited duration (say 5–150 minutes) whereby the starch is not unduly hydrolyzed and wherein the amylase serves to convert the amylaceous material to a flowable liquor; advantageously, the non-amylaceous material is substantially present in a discretely aggregated condition which is pronounced by elevating the starch hydrolyzate to a temperature well in excess of 212° F. and generally in the range of 220°–360° F. by such preferred means as a second jet cooker or other rapid heat transfer means as a steam-jacketed heat exchanger. Upon achieving this further elevation of temperature, the fully converted liquor is held at this post-liquefaction temperature for a period of time to assure complete gelatinization of a starch as well as enzyme inactivation. As a result of such treatment the liquor has an increased level of discretely aggregated materials high in non-amylaceous constituents such as fiber, ash, proteins and lipids. As a consequence the liquor lends itself admirably to filtration and/or centrifugation operations; the filter cake is non-sticky; has about 50% moisture; is readily removable from the filtration media (cloth) and blinds such media only to an extent where continuity of operation is not impaired. Hence, it has been found practical to achieve as high as 95% yield of starch hydolyzate in the filtrate. It is to be appreciated that the post-liquefaction temperature elevation practiced in accordance with this invention is well above that temperature where at mere inactivation of liquefying enzymes occurs. Such temperature elevation of the liquefied starch liquor and maintenance at the elevated temperature can advantageously be effected in an in-line continuous uninterrupted stream which can then be directed to purification or refining units which optionally precede saccharification and the subsequent saccharifying operations which will be explained hereinafter and which may either be for the purpose of producing high dextrose syrup or for producing a syrup high in maltose and maltotriose.

Thus the invention is characterized by rapid and controlled initial gelatinization and liquefaction in which amylolytic enzymic processes are employed to developing a modest DE increase of say 10 to 20 and whereafter the liquor thus produced in a readily handled and pumpable form containing dispersed non-amylaceous constituents is subjected to still higher gelatinization temperatures well above enzyme inactivation temperatures. It appears that by practicing the aforesaid liquefaction and gelatinization procedures, the starch is caused to undergo gelatinization and collateral liquefaction under conditions which achieve improved convertibility of the starch to filterable solids; the non-carbohydrate components of the liquor are present in a condition wherein they may be more readily isolated as desired preparatory to and/or after saccharification as will be discussed hereinafter and as is indicated by the ability to process directly raw, semi-refined, or refined amylaceous material.

Generally, treatment to initially convert the starch liquor by rapid high temperature liquefaction prior to enzyme inactivation involves an initial rapid temperature rise to exceed the gelatinization point but to below the enzyme inactivation temperature (say below 212° F.) and a holding time at said elevated temperature of say 5 to 120 minutes (though longer periods may be practiced) preparatory to final gelatinization; as the liquefying holding period increases up to 150 minutes, later saccharification efficiency increases; beyond this holding period the advantage gain is mainly in filterability of non-amylaceous materials.

Following liquefaction, liquor enzyme inactivation is carried out rapidly by heating to above 212° F. and optimally to 220° to 250° F. to terminate amylolysis and complete gelatinization; these conditions maximize the filterability of non-amylaceous constituents; at temperatures in excess of 260° F., filtration efficiency regresses. Liquor transfer during and after enzyme inactivation should be under such conditions that temperature is maintained elevated, preferably above 212° F., until just prior to the liquor being cooled for adjustment to the desired saccharification temperature.

In one embodiment of the invention to be hereinafter described, the thus liquefied and gelatinized liquor is passed through a clarification section wherein non-carbohydrate constituents in the liquor are removed by such means as vacuum filtration. Enzyme protecting agents such as calcium hydroxide added prior to liquefaction as at the alpha-amylase addition station are found to serve effectively in the liquefaction and the gelatinization zone aforedescribed to promote coagulation and/or precipitation of a major amount of non-carbohydrate-derived constituents such as ash, proteins and lipids native to the raw material; however, addition of such bases as precipitating agents is not essential. Advantageously, high temperature liquefaction and the discrete condition of the starch constituents in the liquor produced thereby enable coagulating or precipitating agents present to more readily clarify the liquor by means known to those skilled-in-the-art and typified by vacuum filtration or centrifugation.

Filtration will result in a liquor which has a high degree of depletion in extraneous non-saccharidal constituents. The practical benefits stemming from this ability to so isolate non-sugar constituents will be apparent to those skilled-in-the-art since the raw unrefined material that is processed will not have transferred to the subsequent saccharification zone an inordinate amount of interfering ash, fiber protein- or lipid-derived materials which impede saccharification efficiency, particularly in those applications calling for conversion of liquors to high dextrose syrups.

However, the benefits of the present invention are also realized in enzymic conversion to less refined syrups since it appears that the discrete condition of the starch hydrolyzate induced by complete gelatinization during the aforesaid high temperature liquefaction permits saccharifying enzymes to be employed without an undue amount of interference from protein degradation products or other obscure side effects which can impede saccharification efficiency. It appears that the liquefied liquor has been so converted by such high temperature liquefaction and gelatinization that it is in a condition wherein a saccharifying enzyme will efficiently function even without clarification to deplete non-carbohydrate constituents from the starch liquor preparatory to saccharification.

Saccharifying operations generally call for a cooling operation to adjust the liquor to the optimal or at least operative saccharifying enzyme temperature range. It should also be noted, however, that for most enzyme systems this range will be at a temperature whereat starch may retrograde from the condition created by liquefaction. Accordingly, transfer to the saccharification zone should be so rapid as to minimize any such retrogradation. Advantageously by reason of the facility with which the liquefied starch can be clarified, there is a minimum of hold-up time as clarification proceeds such that the opportunity for such retrogradation and interference with the saccharification that ensues is minimized.

Preferably the liquor in either a clarified or unclarified condition will be maintained at a temperature in excess of 200° F. and will be transferred in-line through a heat exchanger where it is rapidly cooled to optimal saccharifying temperatures. Saccharification periods as low as 20 minutes can be practiced, although longer saccharification periods will usually be practiced. A syrup having a high percentage of simple sugars giving it properties similar to conventional corn syrups solids but which also contains ash, protein, oil and fiber may be rapidly produced despite the initial presence of any such intefering materials as may be present after filtration.

Another application of the present process is the production of glucose by hydrolyzing starch substrates to glucose by amyloglucosidase. As will be noted from the accompanying operative examples, such starch substrates can be readily converted to dextrose by employment of purified amyloglucosidase (i.e., one that is substantially transglucosidase-free) and advantageously, due to the ability to separate the non-starch residues which coagulate in the converted liquor, interfering processes such as protein denaturation is substantially mitigated.

Whereas the process of the present invention finds its maximum utility and advance over the art in the ability to handle amylaceous materials in their natural growth state, that is, materials which contain protein, fiber, oil and ash, the process should not necessarily be limited in its application to the treatment of such "raw" material since "refined" starches will be similarly advantageously treated. Thus the mixing of amylase with a refined starch and water and the subjection of same to a high temperature liquefaction in accordance with the process of the present invention similarly converts the starch substrate to a handleable condition amenable to the action of saccharifying enzymes, typically fungal enzymes which are rich in amyloglucosidase. It appears that by the process of high temperature liquefaction and gelatinization, refined starches are similarly fully gelatinized and discretely disposed so as to permit the use of saccharifying enzymes which have high rates of conversion to the desired sugar.

By virtue of the ability to isolate native protein and lipid constituents by filtration as disclosed herein prior to saccharification, it is practical to employ a saccharifying enzyme in a less purified form from the standpoints of any lipase or protease activity, although preferably one will employ an amyloglucosidase which is substantially reduced in transglucosidase activity when saccharifying.

The invention will now be described by reference to the accompanying figures schematically showing the operation and the operative examples describing typical processes.

Figure 2:
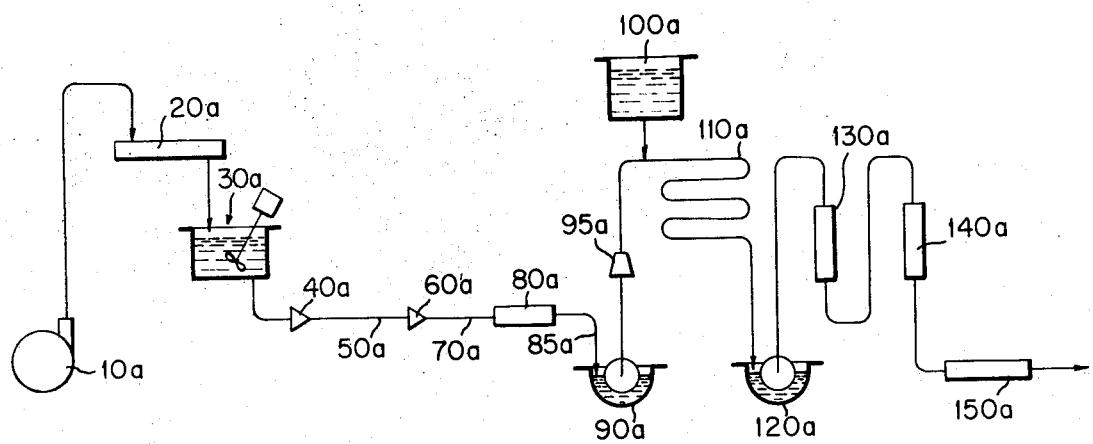
Figure 3:
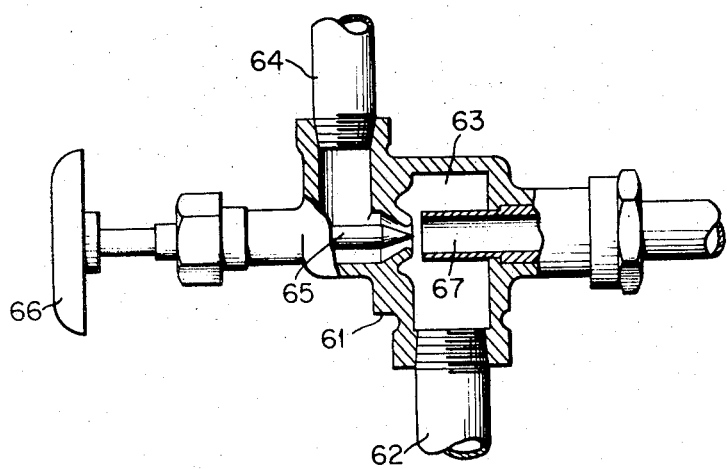

Referring to the accompanying drawings, FIG. 1 shows a schematic flow diagram for an unrefined syrup plant and FIG. 2 shows a schematic flow for a refined syrup plant. FIG. 3 shows a sectional view of a jet cooker to be employed at critical points of the present invention.

Referring to FIG. 1, 300 grams (dry solids) of degerminated corn flour is mixed with water to make a total weight of 1,000 grams. To this mixture is added 0.33 gram calcium hydroxide with simple mixing. Thereafter a 0.1% (0.3 gram) alpha-amylase preparation derived from a bacterial or cereal source is added to the slurry and mixed to assure even distribution of the constituents. As seen in FIG. 1 the corn flour described herein is produced by grinding as shown in 10, screening at 20 to remove coarse particles which are then collected, reground and screened by means not shown, and the flour is then mixed in the mixing section shown as 30.

From the mixing section the slurry is passed through pipe 31 to a first jet cooker to be hereinafter described, shown generally as 40, wherein the slurry is rapidly heated to a temperature of 185° F., at which liquefaction temperature the slurry is maintained for a period of 10–30 minutes while in line 50 to achieve desired liquefaction.

From line 50 the slurry passes to a second jet cooker 60 also to be hereinafter described substantially identical to first jet cooker 40 and wherein the slurry is heated to attain a temperature of 260° F., which temperature is maintained for a perod of 10 minutes while passing through line 70 to heat exchanger 80.

As will be seen by reference to FIG. 3, each jet cooker 40 or 60 comprises a housing 61 to which inlet pipe 62 is adapted to circulate liquor within mixing chamber 63; mixing is caused in chamber 63 by steam supplied through steam supply line 64 to steam-water mixing valve 65 manually adjustable at 66 to vary the steam supply in relation to the water supply and cause the heated liquor to be forced through discharge port 67 which communicates with either line 50 or 70 in FIG. 1 as the case may be.

The liquor or slurry issuing from jet cooker 60 is in a high degree of turbulence upon its entrance to the line forming holding section 70 and such agitation, together with the heat of condensed steam, causes the non-sugar residues to coagulate under the influence of calcium ions introduced initially in mixing section 30. It will be understood that in lieu of calcium compounds added in this mixing section 30 other alkalis or alkaline earth metal compounds may be added such as sodium hydroxide, which compounds also appear to increase the effect of the enzyme system.

The enzyme converted liquor passes through heat exchanger 80 which rapidly cools the liquor to a temperature of about 140° F. after which the liquor has 9.0 grams distillers malt added thereto having a requisite diastatic activity. No pH adjustment is needed at that point and the saccharification operation proceeds in line 100 for about 30 minutes after which the liquor which has now been substantially saccharified to maltose and other saccharides is transferred to a thin film evaporator shown as 110 wherein the liquor is concentrated to a 50–55% dry solids constituency. The concentrated liquor is then cooled by a heat exchanger 120 for storage. The liquor thus produced has the following assay and other physical characteristics.

|  | Percent |
| --- | --- |
| Dextrose equivalent | 35.0–40.0 |
| Sugar analysis: |  |
| Dextrose | 5.0 |
| Maltose | 55.0 |
| Maltotriose | 13.0 |
| Maltotetraose | 10.0 |
| Higher saccharides | 17.0 |
| Protein | 6.0–7 |
| Oil | 2.0 |
| Fiber | 0.9 |
| Ash | 0.6–0.7 |
| Calcium chloride | 0.1 |
| Propylene glycol | 10.0 |
| Water solubles | 60.0–70.0 |
| Color, Yellow |  |
| Viscosity (100° F.), 10,000–14,000 cps. |  |

Referring to FIG. 2 depicting a high dextrose refined corn syrup plant the process will be seen to be comparable in many particulars to that set forth in reference to FIG. 1. Thus, the process comprises a grinding section 10a, a screening section 20a, a water and enzyme addition and mixing section 30a, pet cooker 40a and a liquefying holding section 50a. The process is similar to the process set forth previously with respect to Example 1 up to this point. The liquefied slurry is then passed through a second jet cooker 60a like that shown and described with respect to FIG. 3 wherein the liquor is similarly heated to a temperature of 220° F. and maintained thereat for a period of 5–10 minutes in high temperature liquefaction zone 70a from which the similar liquor is transferred through heat exchanger 80a to cool the liquor to 180° to 190° F. The cooled liquor is rapidly charged through line 85a to a vacuum belt filter generally shown as 90a wherein the bulk of insoluble materials are readily removed and dried as filter cake for disposal as feed by-product. The filtrate liquor is then passed through heat exchanger 95a to cool the liquor to 145° F. The filtrate liquor is then adjusted to pH 4.2 with hydrochloric acid added in tank 100a.

As shown in FIG. 2 a saccharifying enzyme substantially pure in its amyloglucosidase assay and hence substantially free of transglucosidase is fed from enzyme addition tank 100a to holding section 110a at a level of 0.7% amyloglucosidase solution of an activity of 30 D.U./ml. (diazme units per milliliter) on a dry solids basis; a diazme unit is defined as a level of enzyme capable of converting $\frac{1}{80}$ of a pound of starch to glucose. The liquor fed to the saccharifying zone 110a is retained therein for a period depending upon the extent of starch conversion to glucose that is desired. From the holding section 110a the liquor is passed through a vacuum filter 120a to remove small discrete insoluble particles resulting in a clarified syrup which is passed through a charcoal or ion-exchange decolorizing- section 130a and thence to a thin film evaporator 140a where the syrup is concentrated to 80% solids, after which the concentrated syrup is cooled by passage through heat exchanger 150a. The stable syrup thus produced has the following properties.

| Dextrose equivalent | 64. |
| --- | --- |
| Sugar analysis: |  |
| Dextrose | 39%. |
| Maltose | 33%. |
| Higher saccharides | 28%. |
| Protein | Negligible. |
| Oil | Negligible. |
| Fiber | Negligible. |
| Ash | Less than 0.3%. |
| Color | Water white. |

Still higher dextrose yield and dextrose equivalencies for the syrup can be practiced. For a saccharification period of 10–20 hours wherein a substantially unrefined source material is the source of clarified starch, the yield of dextrose will generally range in the order of 60 to 75%, the rate of saccharification being quite rapid for the initial saccharification period, that is, for a period typically ranging from 5 to 20 hours. Thereafter the saccharification rate will reduce but nevertheless the saccharification may be continued for a period of up to 40 hours and will achieve an optimal dextrose equivalency as well as dextrose level in the neighborhood of 70 to 75.

What is claimed is:

1. Process for manufacture of sugar from an aqueous slurry of amylaceous materials containing an amylolytic enzyme at a subgelatinization temperature which comprises continuously injecting steam into a stream of said slurry and causing turbulence therein, thereby subjecting said amylaceous material to continuous enzymatic amylolytic liquefaction and gelatinization conditions wherein the enzyme and aqueous medium are rapidly elevated to a temperature exceeding 160° F. and above the starch gelatinization temperature; holding said slurry under said conditions while transferring it continuously through a liquefaction zone at a temperature less than 212° F. whereby the starch content is gelatinized and liquefied and has a D.E. of at least 10; thereafter further elevating the temperature of the liquefied amylaceous material to in excess of 212° F. whereby starch content is fully gelatinized and non-amylaceous materials present are rendered readily separable as discrete aggregates; and thereafter enzymatically saccharifying the thus liquefied amylaceous substrate.

2. Process according to claim 1 wherein the amylaceous material is in a state containing native ash, fiber, protein and lipid constituents prior to charging to said amylolytic conditions.

3. Process according to claim 1 wherein the aggregates thus produced are filtered from the substrate prior to saccharification.

4. Process according to claim 1 wherein said initial liquefaction is caused to proceed for 5–120 minutes.

5. Process according to claim 1 wherein the second temperature elevation to above 212° F. is effected by steam injection.

6. Process according to claim 2 wherein the fully liquefied substrate is maintained at an elevated temperature above optimal saccharification temperature until just prior to saccharification.

7. Process according to claim 2 wherein the liquefied substrate is saccharified by amyloglucosidase which has a substantially reduced transglucosidase activity.

8. Process according to claim 1 wherein the aggregates are filtered from the substrate after saccharification.

References Cited

UNITED STATES PATENTS

| 3,249,512 | 5/1966 | Bode | 195—31 |
| 3,280,006 | 10/1966 | Hurst et al. | 195—31 |

OTHER REFERENCES

Reed et al.: Enzymes in Food Processing, p. 266, Acidemic Press, New York, N.Y., 1966.

A. LOUIS MONACELL, Primary Examiner

G. M. NATH, Assistant Examiner